United States Patent
Ryu (10) Patent No.: US 8,249,146 B2
(45) Date of Patent: Aug. 21, 2012

(54) METHOD FOR SELECTING CONTENT ADAPTIVE CODING MODE

(75) Inventor: Chul Ryu, Seoul (KR)

(73) Assignee: Dongguk University Industry-Academic Cooperation Foundation, Seoul (KR)

( * ) Notice: Subject to any disclaimer, the term of this patent is extended or adjusted under 35 U.S.C. 154(b) by 484 days.

(21) Appl. No.: 12/582,066

(22) Filed: Oct. 20, 2009

(65) Prior Publication Data

US 2011/0090951 A1    Apr. 21, 2011

(51) Int. Cl.
*H04N 7/12*      (2006.01)

(52) U.S. Cl. ......... 375/240.02; 375/240.01; 375/240.12; 375/240.16; 375/240.26

(58) Field of Classification Search ............. 375/240.02, 375/240.01, 240.12, 240.16, 240.26
See application file for complete search history.

*Primary Examiner* — Sath V Perungavoor
*Assistant Examiner* — Geepy Pe
(74) *Attorney, Agent, or Firm* — Grossman Tucker Perreault & Pfleger, PLLC (57) ABSTRACT

A method for selecting content adaptive coding mode can apply a critical value to update by taking the advantages of a content adaptive MCTF update method and a covered pixel detection algorithm and, at the same time, improve the image quality by selecting a block having improper motion information and converting it into a coding in screen mode. The method also provides a method for selecting content adaptive coding mode that can improve the conventional MCTF algorithm by reusing JND, which is used in content adaptive MCTF, to find a block that has improper coding information and selecting a block that has improper motion information.

12 Claims, 8 Drawing Sheets

METHOD FOR SELECTING CONTENT ADAPTIVE CODING MODE

BACKGROUND

1. Field

The following description relates to encoding and decoding of video signal, more specifically to a method for selecting content adaptive coding mode that can improve image quality by initially selecting a block having improper motion information by using a local dispersion value in the update process of motion compensated temporal filtering (MCTF) and then converting and coding a portion that is difficult to predict into a coding mode in the screen by using the block.

2. Description of the Related Art

Multimedia technologies are required in various sectors due to the recent development of hardware and increased demand by users. Such various user demands have made the use of images increasingly diverse so that it is required to develop a scalable video codec (SVC) technology that allows an image technology to use a single original image in various applications, from TV to DMB and personal terminals, with various qualities, spatial resolutions and frame ratios.

The SVC is divided mainly into space scalability, quality scalability and time scalability. Among them, motion compensated temporal filtering (MCTF) using a lifting scheme corresponding to the space scalability has a basic role in supporting the space scalability of the SVC.

Particularly, the MCTF serves to remove redundancy between frames in addition to providing time scalability by using a wavelet method, and the wavelet filtering is applied by using the lifting scheme.

Figure 1A:
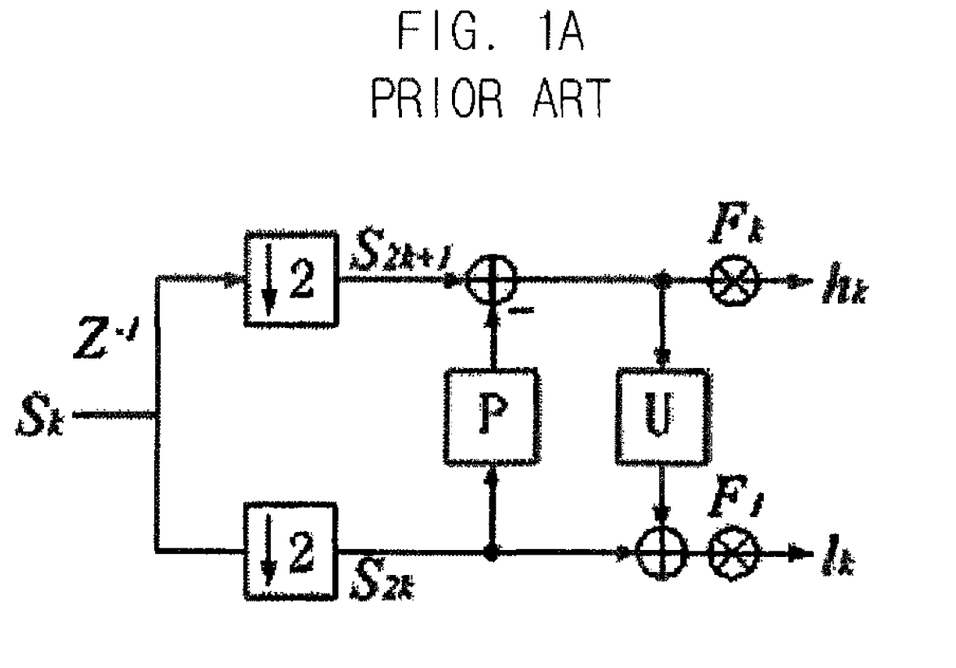
FIGS. 1A and 1B show circuits of MCTF using a lifting scheme and the reverse conversion.
Figure 1B:
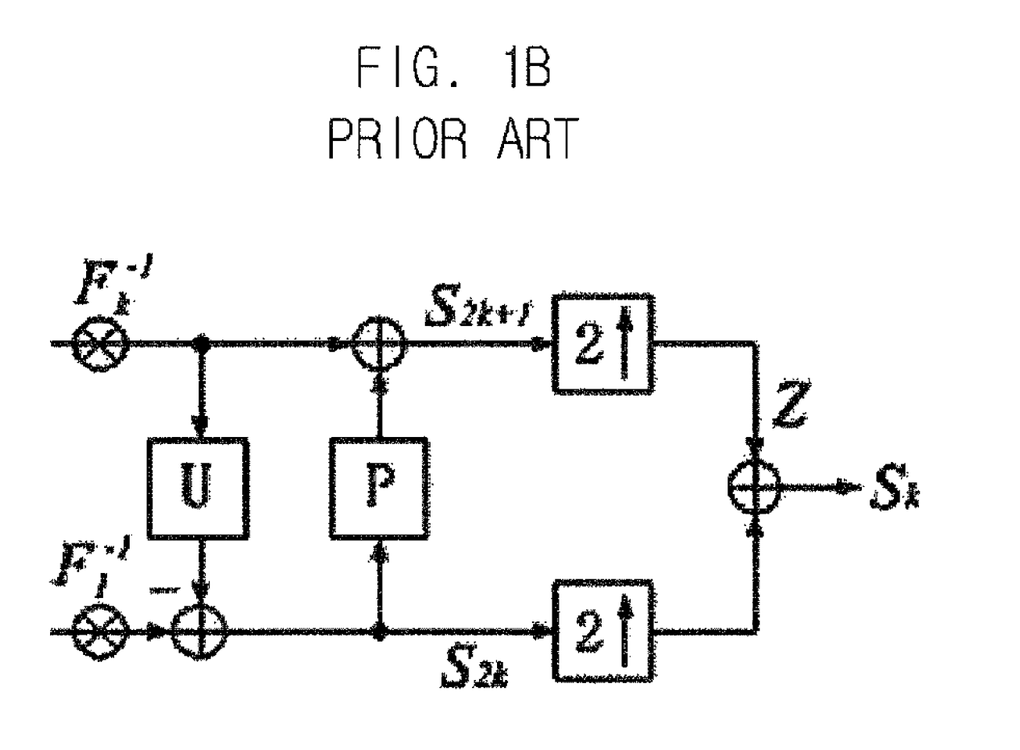

FIGS. 1A and 1B show circuits of MCTF using a lifting scheme and its reverse conversion.

Referring to FIGS. 1A and 1B, the lifting scheme mainly goes through two steps. First, as shown in FIG. 1A, motion information of images has to be found in a prediction process, and then a high frequency band image H is generated by using the motion information. Then, in the second step, a low frequency band image L is generated in an update process by using the high frequency band image, which is generated in the first step. During the two steps, the energy of the images is transferred to as low a frequency band as possible, and low energy is maintained in a high frequency band so as to increase the coding efficiency.

As shown in FIG. 1B, in the reverse conversion, it is also possible to restore the original without new additional information.

Figure 2:
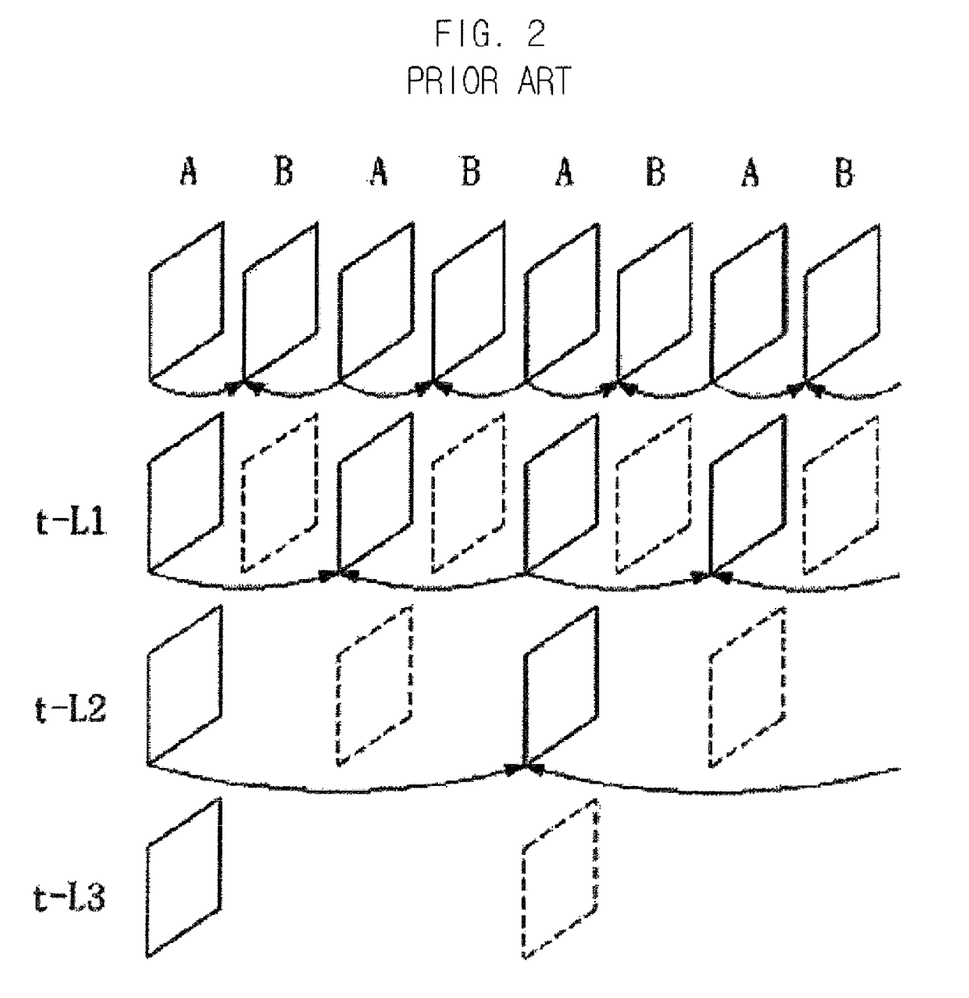
FIG. 2 illustrates problems according to the progress of steps in a conventional 5/3 tap wavelet MCTF coding structure.

However, a disadvantage of the MCTF is that proper motion information can not be found as the step increases. That is, referring to the coding structure of 5/3 tap wavelet MCTF shown in FIG. 2, it can be seen that the time interval between the original image and its reference image becomes wider as the steps t-L1 to t-L3 progress, reducing the relevancy between the images.

As such, an effect of a new object appearing or disappearing may not allow proper motion information to be found, and thus the energy to be transferred to the low frequency band may still remain in the high frequency band, thereby lowering the image quality. Moreover, as the step of the MCTF progresses, the deterioration of the image quality may be accumulated over a period of time, making residual image in the image.

To solve these problems, an update process may be omitted so that the accumulation of such noise is prevented. However, such omission of update may cause the deterioration of power signal-to-noise ratio (PSNR). Such effect is caused by the fact that high frequency band information, which is required for restoring, is omitted due to the omission of update.

To solve this problems of MCTF, a content adaptive MCTF update process may be used as a way to reduce the noise by setting a local dispersion value as a critical value for update.

Another consideration to be taken in the update process of the MCTF using the motion information is multiple updates in a pixel that is referenced multiple times. That is, in the update process of generating a low frequency band by using a high frequency band, the reverse direction of motion information used for generating the high frequency band is used, but this may make multiple updates to be performed in one pixel.

Although the content adaptive MCTF update process may reduce the noise by setting the critical value, it can not prevent multiple updates from being performed in one pixel.

Meanwhile, a covered pixel detection algorithm is used to solve the aforementioned problem, and this may prevent multiple updates from occurring and prevent an update from being performed several times in one pixel by selecting pixels that are connected to one another by executing a coding process in the screen in connection with a block having improper motion information.

SUMMARY

Exemplary embodiments may provide a method for selecting content adaptive coding mode that can apply a critical value to update by taking the advantages of a content adaptive MCTF update method and a covered pixel detection algorithm and, at the same time, improve the image quality by selecting a block having improper motion information and converting it into a coding in screen mode.

Exemplary embodiments also may provide a method for selecting content adaptive coding mode that can improve the conventional MCTF algorithm by reusing JND, which is used in content adaptive MCTF, to find a block that has improper coding information and selecting a block that has improper motion information.

Exemplary embodiments also may provide a method for selecting content adaptive coding mode using a local dispersion value that can improve the image quality of a coded image by extending the range of use to the selection of a coding mode by using the same equation as that of content adaptive MCTF.

Exemplary embodiments also may provide a method for selecting content adaptive coding mode that can improve PSNR without increasing the complexity by making a new function for update by use of a JND value using local dispersion and adaptively selecting a coding mode by using the function according to the pixel value of an image.

In general aspect, a method and a computer-readable storage medium of selecting a content adaptive coding mode includes: retrieving motion information for a current block and generating a high frequency band image by using the retrieved motion information; calculating a local dispersion value JND of a reference block of a reference image and calculating a sum $JND_{sum}$ of all local dispersion values and a sum $U_{sum}$ of extra data U being added to all even frames; setting a coding in screen mode if the $U_{sum}$ value is greater than the first critical value after comparing the calculated $U_{sum}$ value to a first critical value $JND_{sum}+E_B$; comparing the calculated $U_{sum}$ value to a second critical value $JND_{sum}$ if the $U_{sum}$ value is equal to or smaller than the first critical value; maintaining a content adaptive MCTF mode for a corresponding block if the $U_{sum}$ value is equal to or smaller than the second critical value, and adjusting the JND as a critical value of the U if the $U_{sum}$ value is greater than the second critical value, the JND being changed based on a pixel value in the image; and proceeding an update process by using a conventional MCTF method for each pixel in a block, the mode of which is not changed, wherein the $E_B$ is a sum of a tolerance range V permitted for each pixel.

The setting a coding in screen mode is for omitting the update process, and the adjusting the JND as a critical value of the U is for limiting the update process.

In another aspect, a method and a computer-readable storage medium of selecting a content adaptive coding mode includes: retrieving motion information for a current block and generating a high frequency band image by using the retrieved motion information; calculating a local dispersion value JND of a reference block of a reference image and calculating a sum $JND_{sum}$ of all local dispersion values and a sum $U_{sum}$ of extra data U being added to all even frames; applying a content adaptive MCTF update if the U value is within the range of $E_B+JND_{sum}S$; applying an update by adjusting the JND as a critical value of the U if the U value is within the range of $E_B+JND_{sum}S$ but exceeds the range of $JND_{sum}S$, the JND being changed based on a pixel value in the image; modifying a coding mode of a corresponding block into a coding in screen mode if the U value is greater than $E_B+JND_{sum}S$. Here, the S is a coefficient representing the degree of effect by the JND, and the $E_B$ is a sum of a tolerance range V permitted for each pixel.

The retrieving of the motion information for a current block can be performed through a prediction process by performing an MCTF using a lifting scheme and the reverse conversion by applying a wavelet filter.

The critical value can be a permissible range of U according to a difference between a current pixel and its surrounding pixels.

The $JND_{sum}$ can be calculated by $$JND_{sum} = \left[\sum_{x=1}^{B_x}\sum_{y=1}^{B_y} JND_s(x, y)S\right],$$

and the $U_{sum}$ can be calculated by $$U_{sum} = \sum_{x=1}^{B_x}\sum_{y=1}^{B_y} |U[s_i(x, y)]|.$$

Here, S is a coefficient representing the degree of effect by the JND, x and y are coordinates in the block, $B_x$ and $B_y$ are respectively the horizontal and vertical sizes of the block, V is a tolerance range of the U permitted for each pixel, and $E_B$ is a sum of the V.

Additional aspects and advantages of the method for selecting content adaptive coding mode will be set forth in part in the description which follows, and in part will be obvious from the description, or may be learned by practice of the method.

DETAILED DESCRIPTION

The features and advantages of this invention will become apparent through the below drawings and description.

A method for selecting content adaptive coding mode according to certain embodiments of the present invention will be described below in more detail with reference to the accompanying drawings. This, however, is by no means to restrict the present invention to certain embodiments which follow, and shall be construed as including all permutations, equivalents and substitutes covered by the spirit and scope of the present invention. These embodiments presented in the description are intended to implement the present invention and to show those of ordinary skill in the art the scope of the present invention only.

Figure 3:
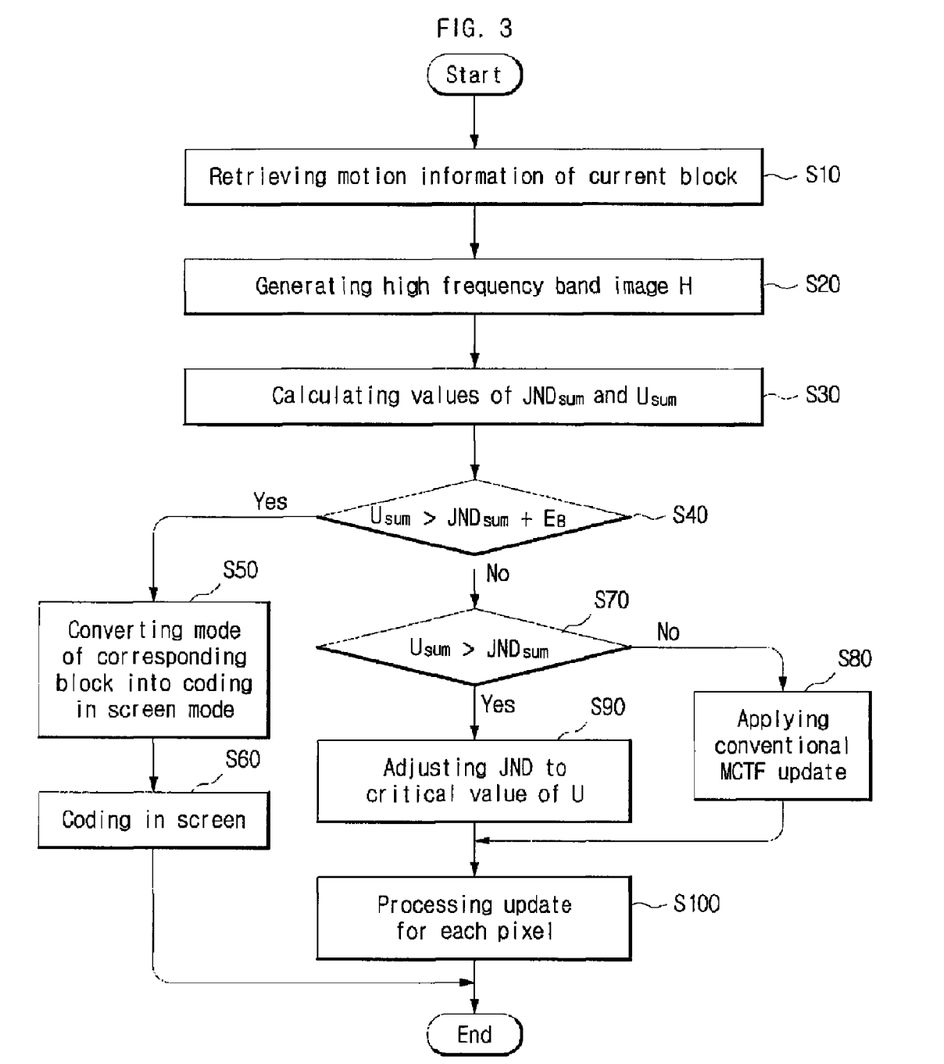
FIG. 3 is a flow diagram describing a method of selecting content adaptive coding mode by using a local dispersion value.

FIG. 3 shows the process flow of a method of selecting content adaptive coding mode by using a local dispersion value in an embodiment.

Referring to FIG. 3, in a content adaptive MCTF, the motion information of a current block is initially retrieved from a prediction process by performing an MCTF using a lifting scheme and the reverse conversion by applying a wavelet filter (S10). Then, a high frequency band image H is generated by using the retrieved motion information (S20).

Looking at the structure of FIG. 1, the generated high frequency band image H can be calculated by the following equation 1.

$$H[i] = s[2i + 1] - P(s[2i + 1]) \text{ with} \qquad \text{[Mathematical Equation 1]}$$

$$P(s[2i+1]) = \frac{1}{2}[MC(s[2i+1], MV_{2i+1 \to 2i}) + MC(s[2i+1], MV_{2i+1 \to 2i+2})]$$

In Mathematical Equation 1, H [i] is a high frequency band image that is generated in a frame prediction process, and P is a result that is predicted by using the motion compensation between adjacent frames. Also, s is the data of image according to the frame number, and $MV_{2i+1 \to 2i}$ is motion information about the movement from an odd frame 2i+1 to an even frame 2i.

Therefore, MC( ) is a frame that is predicted by using the compensation through the motion information.

In Mathematical Equation 2, which follows, L [i] is a low frequency band image, and U is extra data being added into the even frame. The extra data is added into the even frame by using the high frequency band image H [i] and the reverse motion information, which are generated in Mathematical Equation 1.

$$L[i] = s[2i] + U(s[2i]) \text{ with} \qquad \text{[Mathematical Equation 2]}$$

$$U(s[2i]) = \frac{1}{4}[MC(H[i-1], MV_{2i \to 2i-1}) + MC(H[i], MV_{2i \to 2i+1})]$$

As such, the high frequency band image H [i] is initially generated, and then the low frequency band image L [i] is generated.

Looking at the generated low frequency band image L, U is added to the data of image being coded, and in the lifting scheme, it is possible to make a reverse conversion with no loss by using the U value being added in the update process. Nevertheless, it may be recognized as noise when visually observed. Thus, the visually observed noise can be reduced by applying a critical value, which is a permissible range according to the difference between a current pixel and its adjacent pixels, into the value being added during the update process. In general, the noise existing in a screen seems to stand out against a portion in which the change between pixels is not significant, i.e., a portion in which there is no change in color. It is preferable that the critical value, which is a permissible range of the U value, is determined by using this.

Next, JND of a reference block of a reference image is calculated, and the values of $JND_{sum}$ and $U_{sum}$ are calculated (S30). Since JND is a value that is calculated for each pixel, it can be defined by Mathematical Equations 3, 4 and 5 so as to calculate the sum of JNDs in a block in order to process for each block.

$$JND_{sum} = \left[\sum_{x=1}^{B_x}\sum_{y=1}^{B_y} JND_s(x, y)S\right]$$ [Mathematical Equation 3]

$$E_B = B_x B_y V$$ [Mathematical Equation 4]

$$U_{sum} = \sum_{x=1}^{B_x}\sum_{y=1}^{B_y} |U[s_i(x, y)]|$$ [Mathematical Equation 5]

In Mathematical Equations 3 and 4, x and y of are coordinates in the block, and s is a coefficient representing the degree of effect by JND, and $B_x$ and $B_y$ are the horizontal and vertical sizes of the block. Also, V is the tolerance range of the U value for each pixel. That is, when the V value is zero, coding in screen is performed for a block, for which the U value is equal to or greater than the critical value, and as the V value becomes greater, it becomes close to the content adaptive MCTF. Also, $E_B$ is a value that is calculated by the sum of the V values, i.e., a tolerance range for each pixel, and is used in determining the range of the U value where a content adaptive update through JND can be applied without any change.

In Mathematical Equation 5, $B_x$ and $B_y$ are the horizontal and vertical sizes of the block, and are used to calculate the sum $U_{sum}$ of the U values in the block.

When the calculation of the $JND_{sum}$ and $U_{sum}$ values is completed, the calculated $U_{sum}$ value is compared to a first permissible range $JND_{sum}+E_B$ (S40). Namely, within one block, all pixels in this block have a $JND_s(m,n)S$ value, and the $JND_s(m,n)S$ values are added together and compared to the $U_{sum}$ value so as to determine its mode.

After the $U_{sum}$ value is compared to the first permissible range (S40), if the $U_{sum}$ value exceeds the first permissible range, it is determined that the motion information for this block is not correct. Then, an update process for the block is omitted, and its mode is converted into a coding in screen mode (S50). Afterwards, it is coded in the screen, thus improving the image quality (S60). The image quality can be improve by finding a block that has improper motion information, which can deteriorate the image quality, by using a local dispersion value in an image and coding it in the screen.

Also, after the $U_{sum}$ value is compared to the first permissible range (S40), if the $U_{sum}$ value is within the first permissible range, then the $U_{sum}$ value is compared to a second permissible range $JND_{sum}$ (S70).

After the $U_{sum}$ value is compared to the second permissible range $JND_{sum}$ (S70), if the $U_{sum}$ value is within the second permissible range, the block is remained in the conventional MCTF update mode (S80), and if the $U_{sum}$ value exceeds the second permissible range, JND, of which the size is changed according to the pixel value in the screen, is adjusted to the critical value of U in such a way that an update is limited according to the characteristics of the block in the screen and noise is reduced (S90). In this way, since a value equal to or greater than the critical value is not added, multiple updates can be prevented from occurring. If the U value being added during the update is considered as noise, and if the value of pixel has already reached the critical value due to the adding of the noise, the update can be omitted. Thus, the JND value can be used in preventing such multiple updates.

As such, even though the motion information used in the prediction process may be reused in the update process, the motion information used in the update process is the reverse of the motion information, which is used in the prediction process. Thus, pixels referenced several times in the prediction process may add the U value several times in the update process because a certain pixel has a many-to-one relationship rather than a one-to-many relationship.

Next, an update is processed for each pixel in a block in which its mode is not changed (S100). The conventional MCTF method is processed (S80) in case the block is where noise seems not to stand out against its surroundings, but at the same time, the block has proper motion information.

As such, the value of JND is adaptively changed according to the image, and factors of change vary according to the complexity of a portion being coded, thus improving the visual image quality in a flat portion rather than changing the entire power signal-to-noise ratio (PSNR) values. Also, in case of an image that has a very large movement, a portion deteriorating the visual image quality can be selected, and then its coding mode can be changed, thus improving the visual image quality. Namely, the PSNR can be improved without increasing the complexity by making a new function for update by use of a JND value using local dispersion and adaptively selecting a coding mode by using the function according to the pixel value of an image.

Figure 4A:
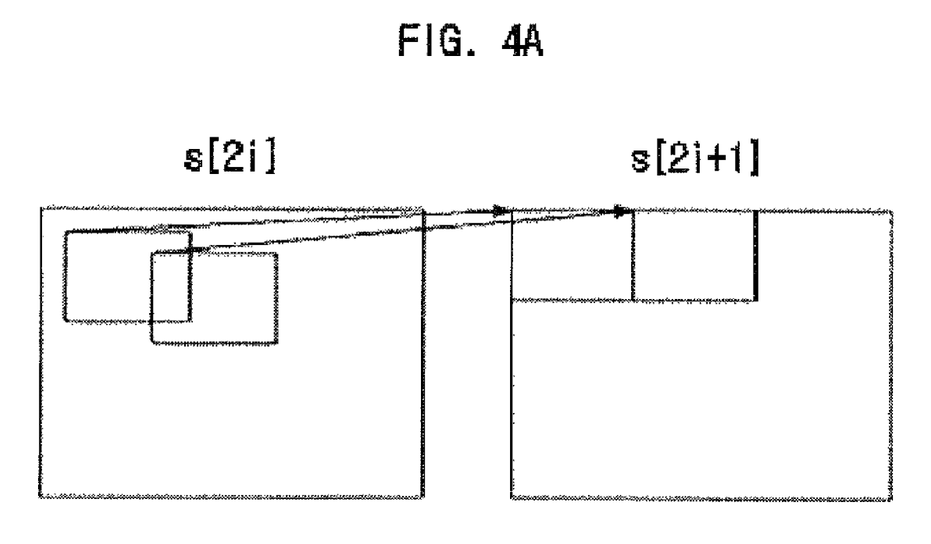
FIGS. 4A and 4B show the predicting process and updating process of MCTF.
Figure 4B:
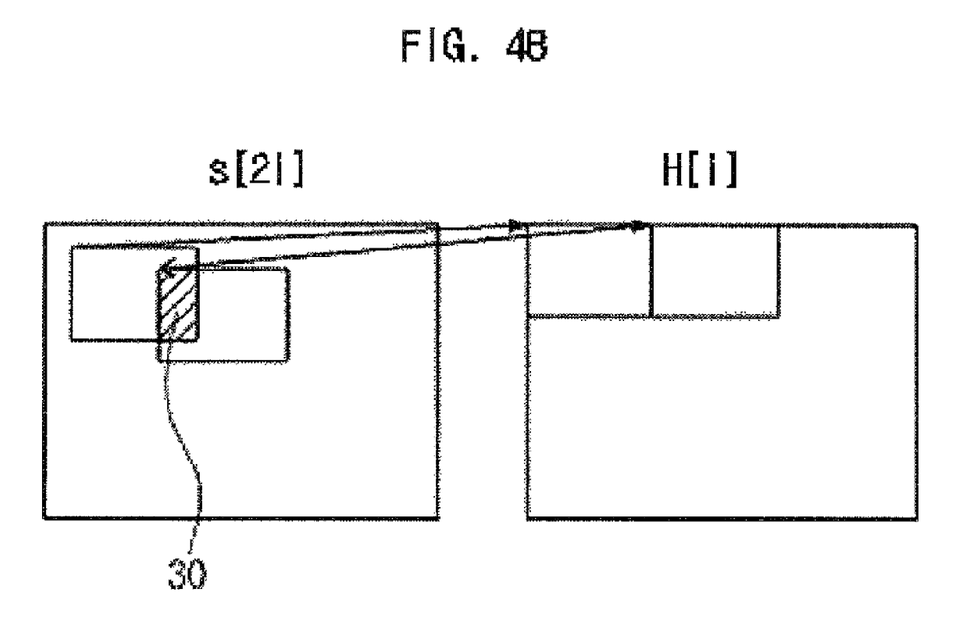

FIGS. 4A and 4B show an embodiment of the predicting process and updating process of the MCTF. Looking at the predicting process, as shown in FIG. 4A, frame s[2i+1] is predicted by using frame s[2i], and then a high frequency band image H[i] is generated by using this.

Then, as shown in FIG. 4B, H[i] is added to s[2i] by using the reverse motion information during the update process. At this time, there occurs a superimposed portion where an update is overlapped on top of another, like a dashed portion 30 in the update process of FIG. 4B.

In this case, if the $U_{sum}$ value is equal to or greater than the critical value, the value of a high frequency band image being added to a low frequency band image is removed as the difference becomes greater, and the original can be damaged while the MCTF is restored. Namely, it can be seen than U with the critical value or greater has not found proper motion information as the difference between U and JND becomes greater. This is because a number of values are still remained in the high frequency band. Thus, in case of the content adaptive MCTF in which this value being trimmed is applied only, it is not likely that the coding between the screens is performed correctly by the proper motion information.

Thus, a block that has improper motion information is selected by using JND, and then the block is coded in the screen, thus improving the image quality. Namely, the conventional MCTF algorithm can be improved by reusing JND, The following Table 1 compares PSNR values of GOP units for each algorithm.

TABLE 1

| Sequence | Algorithm | GOP1 | GOP2 | GOP3 | GOP4 | GOP5 |
| --- | --- | --- | --- | --- | --- | --- |
| foreman | Classic MCTF | 29.62 | 30.42 | 27.67 | 26.99 | 27.73 |
| 352 × 288@30 | Content Adaptive MCTF | 30.40 | 30.94 | 27.87 | 28.40 | 30.18 |
|  | Proposed MCTF | 30.45 | 30.96 | 27.88 | 28.41 | 30.20 |
| football | Classic MCTF | 29.01 | 28.94 | 29.97 | 29.92 | 28.97 |
| 352 × 288@30 | Content Adaptive MCTF | 29.08 | 29.01 | 29.04 | 29.99 | 29.00 |
|  | Proposed MCTF | 29.09 | 29.02 | 29.05 | 30.01 | 29.01 | which is used in the content adaptive MCTF, to find a block that has improper coding information and selecting a block that has improper motion information.

In other words, if most U values in a block are greater than JND, or there is a certain U value that is much greater than JND (that is, if the average of the pixel values in the block is equal to or greater than the critical value JND), the sum $U_{sum}$ of the U values in the block is greater than the value of $E_B+JND_{sum}S$. In this case, the update process is immediately omitted, and the coding mode of the block is converted to a coding in screen mode (S50).

[Mathematical Equation 6]

$$f(U(s[2i])) = \begin{cases} U(s[2i]) & |U(s[2i])| < JND_{s[2i]}S \\ \pm JND_{s[2i]}S & U(s[2i]) \geq JND_{s[2i]}S \\ & \text{and } U(s[2i]) \leq E_B + JND_{s[2i]}S \\ \text{Intra coding} & U(s[2i]) \geq E_B + JND_{s[2i]}S \end{cases}$$

Mathematical Equation 6 shows an enhanced update function. Here, S is a coefficient representing the degree of effect by JND, and the U value being added into the low frequency band can be adjusted by changing the S value. That is, if the S value is zero, the result is the same as omitting the update process, and if the S value approaches infinitely, it can have the same result as that of the convention MCTF using the lifting scheme.

The enhanced update function divides the U value into three ranges by using JND and $E_B$, and can code the U value according to each situation.

Namely, in a first range, if the U value is within the range of $E_B+JND_{sum}S$ and $JND_{sum}S$, a content adaptive MCTF update is applied. In a second range, if the U value is within the range of $E_B+JND_{sum}S$ but exceeds the range of $JND_{sum}S$, JND, of which the size is changed according to the pixel value in the screen, is adjusted to the critical value of U in such a way that an update is limited according to the characteristics of the block in the screen, thus preventing multiple updates from occurring. In a third range, if the U value exceeds a certain range (that is, if the U value exceeds the range of $E_B+JND_{sum}S$), it is considered that improper motion information is applied, and then the coding mode of the block is converted to a coding in screen mode.

For a test of the method for selecting content adaptive coding mode using the dispersion value, the embodiment sets 16 pages of images as GOP, and time scalability with 4 steps is applied.

Parameters such as S=12.5, D=100 and a window size W=3×3 are used when an algorithm is applied, and a parameter $E_B$ of the proposed algorithm is set to 2. In this test, "foreman" and "football" images are used.

As shown in Table 1, each result shows PSNR values compared with the original after the four steps of the MCTF are applied.

Looking at the results of each method, it can be seen that the results of PSNR in the embodiment have little difference from the conventional methods or have a small increase. When it is determined that the coding between screens in the image has improper motion information, such small increase of the PSNR is obtained by coding it with a coding in screen mode. Such coding mode conversion occurs more frequently in a flat portion in which noise can be visually felt greater.

Figure 5A:
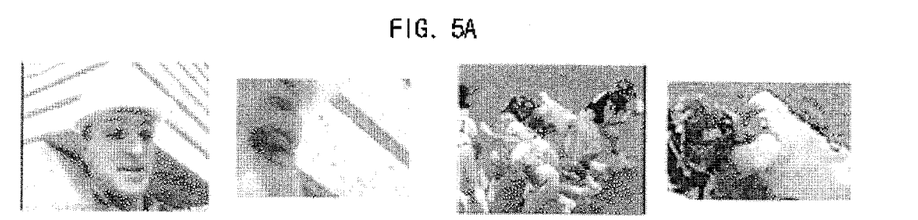
FIGS. 5A to 5C are images illustrating the result of four steps of MCTF to which a same parameter is applied.
Figure 5B:
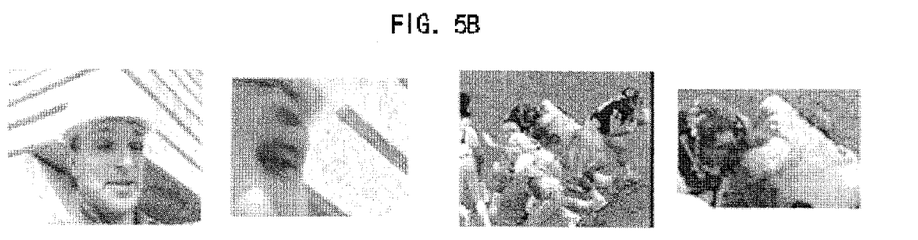
Figure 5C:
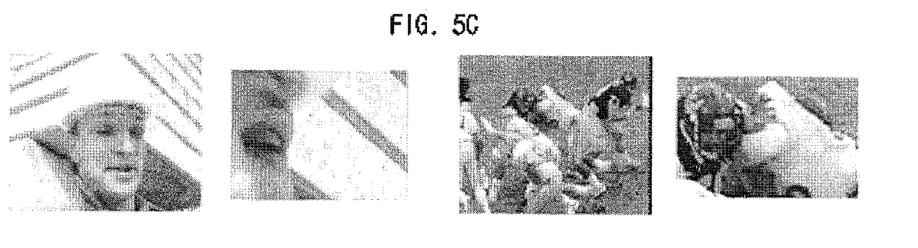
Figure 6:
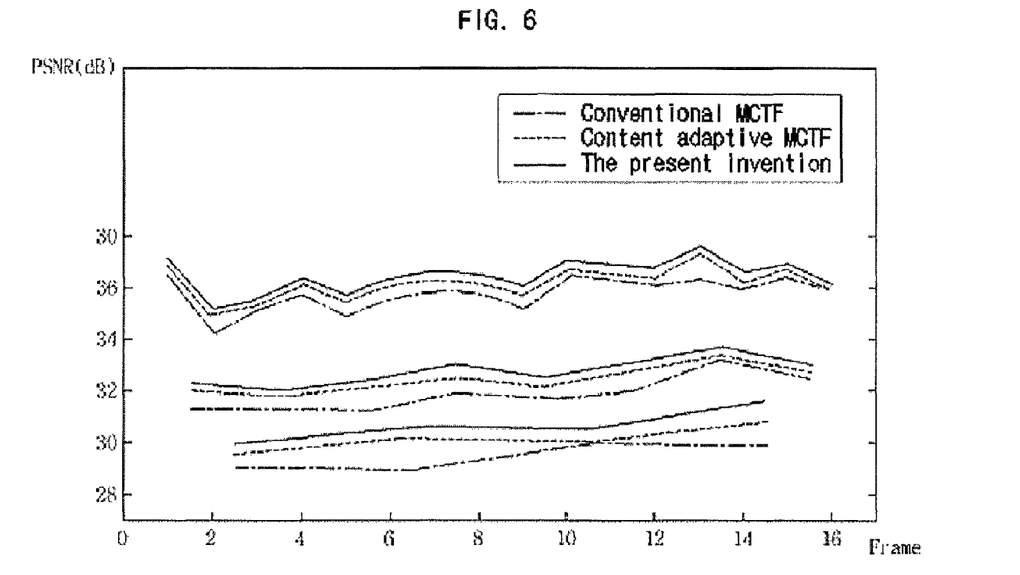
FIG. 6 is a graph illustrating the result of four steps of MCTF to which a same parameter is applied.

FIGS. 5A to 5C are images illustrating the result of four steps of MCTF to which same parameters are applied, like the results of Table 1, and FIG. 6 is a graph illustrating the result of four steps of MCTF to which same parameters are applied, like the results of Table 1.

FIG. 5A shows images that are provided by using the conventional MCTF algorithm, and FIG. 5B shows images that are provided by using the content adaptive MCTF algorithm, and FIG. 5C shows images that are provided by using the MCTF algorithm according to an embodiment.

Looking at the result images of FIGS. 5A to 5C, it can be seen that the image quality of a flat portion is improved when the MCTF algorithm according to an embodiment is used. Also, it can be seen that a high frequency band image portion, which looks like noise, in the update process is reduced, thus improving the image quality.

The image quality of the flat portion is improved much more significantly than that of an edge portion. This is because the flat portion has a lower critical value for update.

Looking at the result graph of FIG. 6, it can be seen that the embodiment has significantly less noise than the conventional MCTF method, and when looking at the edge portion, it can be seen that noise due to improper motion information is dispersed.

Comparing the content adaptive MCTF method with the proposed MCTF method, the two methods have almost the same result for a flat portion, and there is no difference between them particularly for a portion that has a small movement. Namely, the image quality of a coded image can be improved by expanding the range of use to the selection of a coding mode by using the same equation as that of the content adaptive MCTF. Conversely, in case of a portion adjacent to the edge where there is a movement, the proposed MCTF method shows no noise. This shows that better image quality can be obtained by selecting a block that has improper motion information and then coding the block in the screen. Such small increase of PSNR is the result of the coding board conversion.

While the spirit of the present invention has been described in detail with reference to a particular embodiment, the embodiment is for illustrative purposes only and shall not limit the present invention. It is to be appreciated that those skilled in the art can change or modify the embodiment without departing from the scope and spirit of the present invention.

As such, many embodiments other than that set forth above can be found in the appended claims.

What is claimed is:

1. A method of selecting a content adaptive coding mode, the method comprising:
retrieving motion information for a current block and generating a high frequency band image by using the retrieved motion information;
calculating a local dispersion value JND of a reference block of a reference image and calculating a sum $JND_{sum}$ of all local dispersion values and a sum $U_{sum}$ of extra data U being added to all even frames;
setting a coding in screen mode when the $U_{sum}$ value is greater than the first critical value after comparing the calculated $U_{sum}$ value to a first critical value $JND_{sum}+E_B$;
comparing the calculated $U_{sum}$ value to a second critical value $JND_{sum}$ when the $U_{sum}$ value is equal to or smaller than the first critical value;
maintaining a content adaptive motion compensated temporal filtering mode for a corresponding block when the $U_{sum}$ value is equal to or smaller than the second critical value, and adjusting the JND as a critical value of the U when the $U_{sum}$ value is greater than the second critical value, the JND being changed based on a pixel value in the image;
proceeding an update process by using a conventional motion compensated temporal filtering method for each pixel in a block, the mode of which is not changed,
wherein the $E_B$ is a sum of a tolerance range V permitted for each pixel.

2. The method of claim 1, wherein the retrieving of the motion information for a current block is performed through a prediction process by performing an MCTF using a lifting scheme and the reverse conversion by applying a wavelet filter.

3. The method of claim 1, wherein the critical value is a permissible range of U according to a difference between a current pixel and its surrounding pixels.

4. The method of claim 1, wherein the $JND_{sum}$ is calculated by $$JND_{sum} = \left[\sum_{x=1}^{B_x}\sum_{y=1}^{B_y} JND_s(x, y)S\right],$$

and the $U_{sum}$ is calculated by $$U_{sum} = \sum_{x=1}^{B_x}\sum_{y=1}^{B_y} |U[s_i(x, y)]|,$$

and
wherein S is a coefficient representing the degree of effect by the JND, x and y are coordinates in the block, $B_x$ and $B_y$ are respectively the horizontal and vertical sizes of the block, V is a tolerance range of the U permitted for each pixel, and $E_B$ is a sum of the V.

5. The method of claim 1, wherein the setting a coding in screen mode is for omitting the update process.

6. The method of claim 1, wherein the adjusting the JND as a critical value of the U is for limiting the update process.

7. A method of selecting a content adaptive coding mode, the method comprising:
retrieving motion information for a current block and generating a high frequency band image by using the retrieved motion information;
calculating a local dispersion value JND of a reference block of a reference image and calculating a sum $JND_{sum}$ of all local dispersion values and a sum $U_{sum}$ of extra data U being added to all even frames;
applying a content adaptive motion compensated temporal filtering update when the U value is within the range of $E_B+JND_{sum}S$;
applying an update by adjusting the JND as a critical value of the U when the U value is within the range of $E_B+JND_{sum}S$ but exceeds the range of $JND_{sum}S$, the JND being changed based on a pixel value in the image;
modifying a coding mode of a corresponding block into a coding in screen mode when the U value is greater than $E_B+JND_{sum}S$,
wherein the S is a coefficient representing the degree of effect by the JND, and the $E_B$ is a sum of a tolerance range V permitted for each pixel.

8. The method of claim 7, wherein the retrieving of the motion information for a current block is performed through a prediction process by performing an MCTF using a lifting scheme and the reverse conversion by applying a wavelet filter.

9. The method of claim 7, wherein the critical value is a permissible range of U according to a difference between a current pixel and its surrounding pixels.

10. The method of claim 7, wherein the $JND_{sum}$ is calculated by $$JND_{sum} = \left[\sum_{x=1}^{B_x}\sum_{y=1}^{B_y} JND_s(x, y)S\right],$$

and the $U_{sum}$ is calculated by $$U_{sum} = \sum_{x=1}^{B_x}\sum_{y=1}^{B_y} |U[s_i(x, y)]|,$$

and
wherein S is a coefficient representing the degree of effect by the JND, x and y are coordinates in the block, $B_x$ and $B_y$ are respectively the horizontal and vertical sizes of the block, V is a tolerance range of the U permitted for each pixel, and $E_B$ is a sum of the V.

11. A non-transitory computer-readable storage medium encoded with computer-executable instructions, which when executed by a computer, cause the computer to perform a method comprising:
retrieving motion information for a current block and generating a high frequency band image by using the retrieved motion information;
calculating a local dispersion value JND of a reference block of a reference image and calculating a sum $JND_{sum}$ of all local dispersion values and a sum $U_{sum}$ of extra data U being added to all even frames;

setting a coding in screen mode when the $U_{sum}$ value is greater than the first critical value after comparing the calculated $U_{sum}$ value to a first critical value $JND_{sum}+E_B$;

comparing the calculated $U_{sum}$ value to a second critical value $JND_{sum}$ when the $U_{sum}$ value is equal to or smaller than the first critical value;

maintaining a content adaptive motion compensated temporal filtering mode for a corresponding block when the $U_{sum}$ value is equal to or smaller than the second critical value, and adjusting the JND as a critical value of the U when the $U_{sum}$ value is greater than the second critical value, the JND being changed based on a pixel value in the image; and proceeding an update process by using a conventional motion compensated temporal filtering method for each pixel in a block, the mode of which is not changed, wherein $E_B$ the is a sum of a tolerance range V permitted for each pixel.

12. A non-transitory computer-readable storage medium encoded with computer-executable instructions, which when executed by a computer, cause the computer to perform a method comprising:

retrieving motion information for a current block and generating a high frequency band image by using the retrieved motion information;

calculating a local dispersion value JND of a reference block of a reference image and calculating a sum $JND_{sum}$ of all local dispersion values and a sum $U_{sum}$ of extra data U being added to all even frames;

applying a content adaptive motion compensated temporal filtering update when the U value is within the range of $E_B+JND_{sum}S$;

applying an update by adjusting the JND as a critical value of the U when the U value is within the range of $E_B+JND_{sum}S$ but exceeds the range of $JND_{sum}S$, the JND being changed based on a pixel value in the image;

modifying a coding mode of a corresponding block into a coding in screen mode when the U value is greater than $E_B+JND_{sum}S$, wherein the S is a coefficient representing the degree of effect by the JND, and the $E_B$ is a sum of a tolerance range V permitted for each pixel.

* * * * *